Jan. 13, 1959     H. A. TALMADGE     2,867,883
CLAMP
Filed April 19, 1956
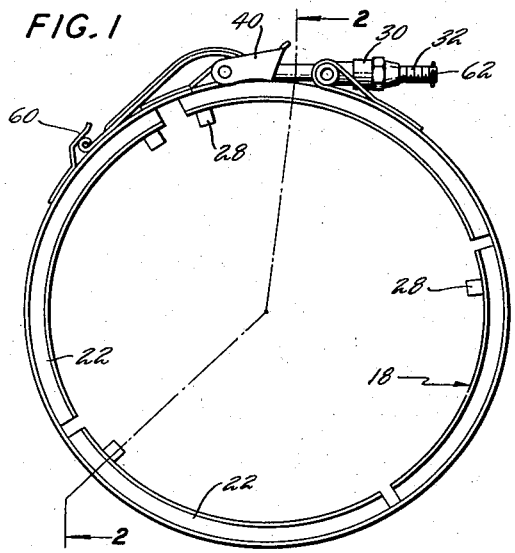
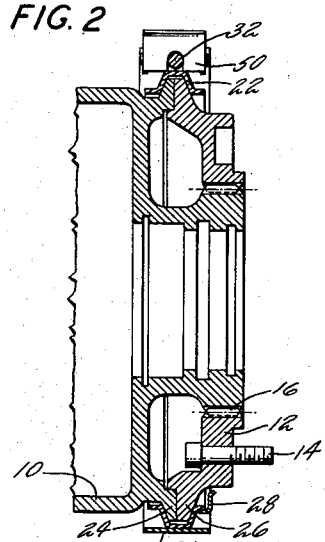
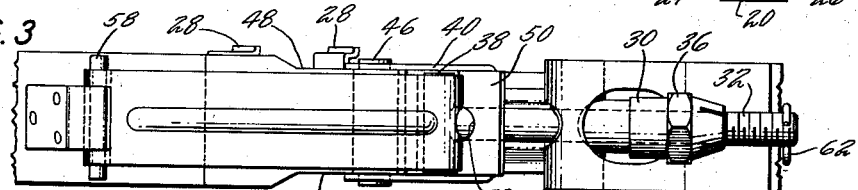
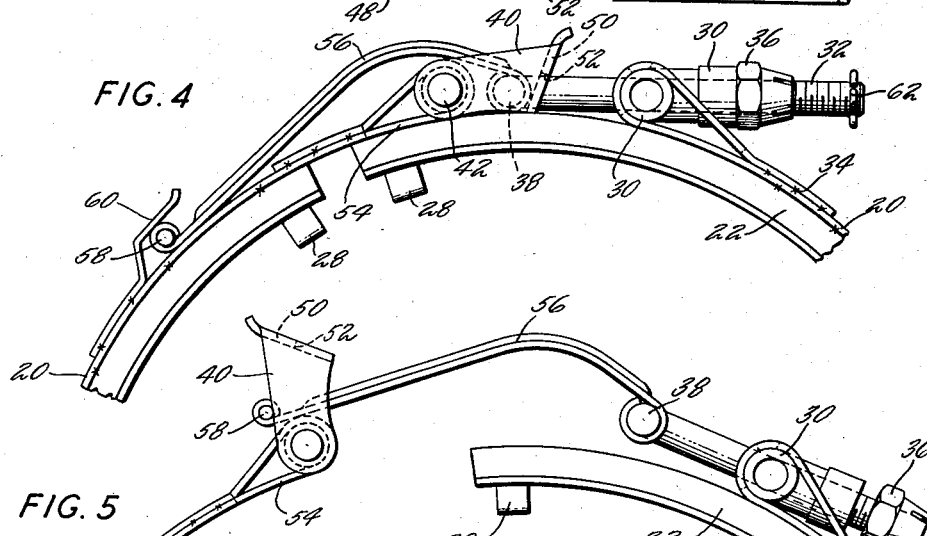
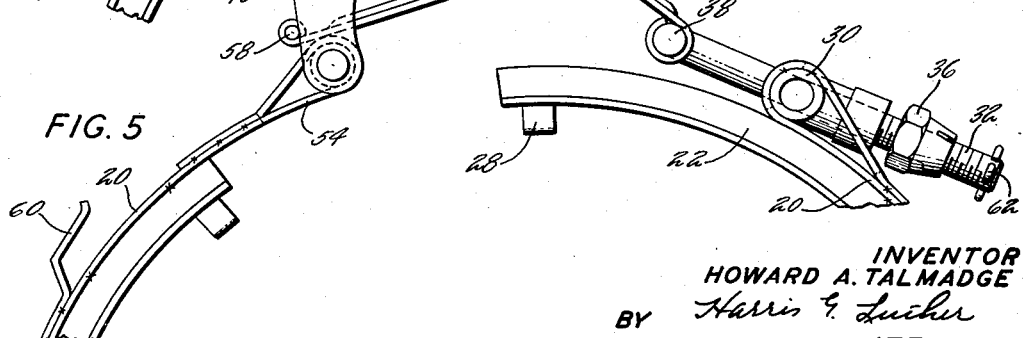
INVENTOR
HOWARD A. TALMADGE
BY *Harris G. Luther*
ATTORNEY

United States Patent Office 2,867,883
Patented Jan. 13, 1959

2,867,883
CLAMP

Howard A. Talmadge, Granville, Mass., assignor to United Aircraft Corporation, East Hartford, Conn., a corporation of Delaware Application April 19, 1956, Serial No. 579,303

10 Claims. (Cl. 24—279)

This invention relates to improved clamping means and particularly to quick release means for a tension band type of clamp.

An object of the invention is a tension band clamp having threaded tensioning means, a quick release, a stop limiting the opening movement of the clamp and retainers retaining the clamp on one of the clamped parts.

A further object is a strap tensioning device having a quick release gate and a stop coacting with this gate to limit the opening of the strap.

A still further object is a threaded clamp closing mechanism having a movable abutment coacting with the closing mechanism in closing the clamp and coacting with other mechanisms for limiting the opening movement of said clamp.

Other objects and advantages will be apparent from the attached specification and the accompanying drawings in which:

Fig. 1 is a side view of the clamp in closed position.

Fig. 2 is a sectional view of the clamp in clamping position coupling two separable members together taken on line 2—2 of Fig. 1.

Fig. 3 is an enlarged plan view of the closing means in the closed position shown in Fig. 1.

Fig. 4 is an enlargement of the closing means of Fig. 1 in closed position.

Fig. 5 is the mechanism of Fig. 4 in open position.

The clamp closing and releasing mechanism of this application finds particular utility in and is shown applied to a clamp for coupling a starter, a portion of which is indicated at 10, to an engine or engine adapter indicated at 12. The adapter 12 may be secured to an engine or gear case, not shown, by cap screws or bolts 14. Relative rotation of starter 10 and adapter 12 may be restrained by splines, 16.

The clamp 18 comprises a tension band 20 with a plurality of inwardly opening channel shaped segments 22 carried by the tension band 20. The channel shaped segments 22 have diverging side walls which coact with mating walls on flanges 24 and 26 on the starter 10 and the adapter 12 and act to couple the starter and adapter as the clamp is contracted. When the clamp is expanded the flange 24 of the starter may be withdrawn from under the clamp but the extension or lugs 28 prevent removal of the clamp from the adapter so that when the starter is removed the clamp will remain with the engine. Although a starter coupling clamp has been selected for illustrating the invention, it will be understood that the invention is not limited thereto but may be used in other ways, particularly where easy and quick removal and replacement are desired.

The clamp closing mechanism comprises contracting means including a T-bolt 32 and a T-member 30 connecting the two ends of the tension band 20. The T-head of the bolt is secured to one end of the tension band by means described hereinafter and the stem of the T-bolt passes through a hollow T-shaped abutment member 30 which is journalled to the other end of the tension band and serves as a seat or abutment for the nut 36 on the T-bolt.

The T-shaped member 30 is pivoted by its cross arms to the tension band 20. The stem of the T is hollow to receive the T-bolt 32. The journal for T-member 30 may be formed in any suitable manner such as by looping the band back on itself and spot welding the overlapping portions at 34. The loop may be bifurcated or suitably apertured to pass the bolt 32.

The nut 36 threaded on the shank of the T-bolt 32 seats on the hollow T-member 30 and serves to contract the contractible means including members 30 and 42 to draw or pull the two ends of the tension member 20 together to contract the clamp. In contracting, the divergent sides of the channel 22, acting on the bevelled faces of the flanges 24 and 26, draw them together in the well known manner to clamp the flange 24 to the flange 26.

The T-head 38 of the bolt 32 is secured to the one end of the tension band 20 by means of a gate 40 hinged on a pin 42 retained by a loop 54 in the end of the tension band in a manner similar to that by which the T-member 30 is hinged to the other end of the tension band 20. The gate 40 is a U-shaped member whose sides fit over a reduced portion 46 of the pin 42. The width of the strap 20 is reduced at 48 to accommodate the pin 42 and the gate 40. The bottom 50 of the U-shaped gate forms an abutment for T-head 38 and is arranged at an angle to the line connecting the center of the pin 42 and the center of the T-portion of the member 30 so that tightening of the nut 36 will tend to force the gate member 40 down against the channel segment 22 that extends under the gate 40. The stem portion of the T-bolt 32 is received in a slot 52 in the bottom 50 of the gate 40 and is prevented by the slot 52 from riding up the bottom 50.

From the structure so far described, it will be apparent that T-bolt 32 connects the two ends of the strap 20 and the tightening of the nut 36 will contract the strap. It is also apparent that movement of the gate 40 upwardly about its hinge 42 will release the T-head 38 from the gate 40 and the end 54 of the strap 20 so that the T-head 38 may pass under the gate and the clamp may be expanded to release the flange 24.

In order to be sure that the clamp will not be removed from the flange 26, in releasing flange 24, it is desirable to limit the extent of opening of the clamp. In order to accomplish this, an extension 56 is pivoted on the T-head 38 and extends beyond the end 54 along the strap 20. The extension 56 is made narrow enough so that it will pass through gate 40 when the gate is raised. A pin 58 is secured at the end of extension 56 and extends laterally thereof. Pin 58 is made long enough so that it will not pass under the gate 40 and thus, as shown in Fig. 5, acts as a stop to limit the opening of the clamp. A cotter pin 62 or some other suitable obstruction may be placed at the threaded end of the T-bolt 32 to limit the extent to which the nut 36 may be backed off and thus limit the extent to which the clamp may be opened by loosening of the nut 36. Ordinarily, the obstruction 62 will be placed in a position which will determine the extent to which the nut 36 should be backed off to loosen the clamp sufficiently so that the gate 40 may be easily raised.

By thus limiting the clamp opening by the obstruction 62 and by the pin 58 and gate 40, it will not be possible to take the clamp off of flange 26 unless and until the nut 36 is unscrewed a material distance greater than that necessary to loosen the clamp sufficiently to permit the raising of the gate 40. In order to loosen the nut 36 further, it will, of course, be necessary to remove the obstruction 62.

In using this clamp, it would first be completely opened so as to permit assembly of the extensions 28 over the flange 26 and the clamp would then be tightened sufficiently to retain the clamp on the flange 26. The flange 24 of starter 10 could then be placed under the expanded clamp and the clamp manually contracted sufficiently so that the gate 40 could be dropped in front of the T-head 38 of the bolt 32, thus retaining the clamp in partially contracted position. The nut 36 could then be tightened to contract the clamp with the T-head 38 acting against abutment or bottom 50 of the U-shaped member 40 to draw the end 54 of the strap 20 toward the other end of the strap 20. In opening the clamp to remove the starter 10 the nut 36 is backed off only sufficiently to permit lifting of the gate 40, thus removing the abutment 50 out of the path of the T-head 38 so that the clamp or tension member 20 may be expanded either manually or due to its resilient springiness until limited by contact of the pin or stop 58 with the gate 40. The clamp and all of its contracting mechanism would still be retained assembled with no loose parts, and the starter 10 with its flange 24 can be removed without removing the clamp from the engine or adapter 12. Thus, the starter 10 may be removed and replaced without danger of misplacing any parts, as they will all remain assembled and in place on the engine. If desired, a retainer 60 may be secured to the strap 20 in such a position that the end of extension 56 may be received under the retainer and held in position while the strap is in contracted position.

It is to be understood that the invention is not limited to the specific embodiment herein illustrated and described, but may be used in other ways without departure from its spirit as defined by the following claims.

I claim:

1. Clamp closing means for a clamp having two relatively movable portions, said closing means connecting said portions and having two spaced enlargements along one part of said closing means, a movable gate carried by one realtively movable portion of said clamp and having an aperture therein through which said one part extends and which will pass one but not the other of said enlargements, an abutment on said gate movable into the closing movement path of said one enlargement to provide both an abutment for said clamp closing means and a connection between said closing means and said one relatively movable clamp portion, the abutment portion of said gate being movable out of said path, said other enlargement cooperating with another portion of said gate when the abutment is moved out of said path to limit the opening movement of said clamp.

2. Clamp closing means as claimed in claim 1 in combination with a clamp comprising a tension band in the form of an inwardly opening channel with diverging side walls for clamping together a pair of flanges having bevelled edges coacting with said side walls, one of said walls having depending restraining means, said clamp, in its limited opening movement, opening sufficiently to permit removal of one of said flanges from under said clamp while said restraining means is long enough to extend back of the other of said flanges and prevent removal of said clamp from said other flange.

3. A clamp comprising an encircling band, an abutment secured to one end of said band, a hinged abutment secured to the other end of said band, contractable means connecting said abutments to draw said abutments together to tighten said band, the walls of said hinged abutment defining an aperture through which the adjacent end of said contractable means may pass upon movement of said abutment about its hinge, and an extension of said contractable means connected to said adjacent end passing through said aperture and including a stop on said extension spaced from said adjacent end and too big to pass through said aperture.

4. A clamp having two relatively movable parts, contracting means for said clamp having two relatively movable sections, one section being secured to one part of said clamp, means releasably securing the other section to the other part of said clamp, said releasable means comprising a gate hinged to said other part and having an aperture for passing said other section and an abutment for restraining said other section and movable about said hinge selectively to present said abutment to said other section, and stop means connected with said other section extending from said other section through said gate and having an enlargement remote from said section adapted to contact said gate and limit opening movement of said clamp parts.

5. A coupling clamp of the quick release type comprising a tension band having free ends, a U-shaped member having a pivotal support at its open end on one free end of said tension band for movement toward and away from said tension band, a T-bolt pivotally supported on the other free end of said tension band with the T-portion of the bolt extending toward said one free end with said bolt passing between the sides of said U-member and between said U-member and tension band, the closed end of said U providing a seat for said T-portion, the closed end of said U-member and the pivot support of said U-member being sufficiently spaced from each other, and the sides of said U-member being sufficiently spaced to pass said T-portion upon movement of said U-member away from said tension band, limiting means connected with said T-bolt and passing between the sides of said U-member and having a T-head too large to pass said U-member thus limiting the opening movement of said tension band.

6. A clamp as claimed in claim 5 in which the tension band is in the form of a circular band comprising a radially inwardly opening channel with diverging side walls for clamping together a pair of flanges having bevelled edges coacting with said side walls, one of said walls having depending restraining means, said clamp in its limited opening movement opening sufficiently to permit removal of one of said flanges from said clamp while said restraining means prevents removal of said clamp from said other flange.

7. A coupling clamp comprising a band adapted to encircle the coupling and having means for contracting said band on to said coupling to couple said coupling and being expandable to release said coupling, said contracting means comprising a first abutment hinged to one end of said band and a second abutment hinged to the other end of said band, a hinge for said second abutment, a T-bolt passing through said first abutment and having its cross bar restrained by said second abutment, a nut threaded on said T-bolt and adapted to contract said first abutment in contracting said band, said second abutment being apertured to pass said cross bar upon movement of said second abutment about its hinge, an extension hinged on said cross bar and having a stop at its remote end coacting with said second abutment to limit the expansion of said band, lugs depending from one side of said band for retaining said band on one of said coupling parts when said band is expanded.

8. A clamp of the quick release type comprising a tension band having free ends, a movable gate pivotally supported on one free end of said tension band and movable between open and closed positions, a bolt pivotally supported on the other free end of said tension band being adapted to extend through said gate and having a head, said gate in its closed position providing a seat for said head thus connecting said bolt with said one free end, said gate in its open position defining an aperture through which said head may pass, an extension extending from said head through said aperture and over said pivotal support for said movable gate, an enlargement on said extension, adjacent the end thereof remote from said head, larger than said aperture and coacting with said gate to limit the opening movement of said clamp with said gate in its open position.

9. A coupling clamp as claimed in claim 7 in which the extension passes through said aperture and over and beyond said hinge for said second abutment.

10. A coupling clamp as claimed in claim 5 in which the limiting means extends over and beyond said pivotal support of said U-shaped member with said T-head located adjacent the remote end of said limiting means and means carried by said tension band for positioning said T-head when said clamp is contracted.

References Cited in the file of this patent

UNITED STATES PATENTS

| | | |
|---|---|---|
| 1,785,059 | Weisman | Dec. 16, 1930 |
| 2,145,680 | Bennett | Jan. 31, 1939 |
| 2,283,179 | Buckingham | May 19, 1942 |
| 2,711,572 | Christophersen | June 28, 1955 |